US009300231B2

(12) United States Patent
Chien et al.

(10) Patent No.: US 9,300,231 B2
(45) Date of Patent: Mar. 29, 2016

(54) OUTPUT CONTROL APPARATUS OF A MOTOR AND METHOD FOR CONTROLLING A CONTROLLER OF THE SAME (71) Applicant: INDUSTRIAL TECHNOLOGY RESEARCH INSTITUTE, Hsin-Chu (TW)

(72) Inventors: Shih-Hsiang Chien, Yilan County (TW); Chin-Hone Lin, Nantou County (TW); Hsieh-Tai Su, New Taipei (TW); Pin-Yung Chen, Hsinchu (TW); Yung-Chen Wang, Hsinchu County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 48 days.

(21) Appl. No.: 14/199,073

(22) Filed: Mar. 6, 2014

(65) Prior Publication Data
US 2015/0162855 A1 Jun. 11, 2015

(30) Foreign Application Priority Data

Dec. 10, 2013 (TW) .............................. 102145406 A (51) Int. Cl.
*G06F 1/26* (2006.01)
*B60K 6/48* (2007.10)
*H02P 6/00* (2006.01)
*H02P 27/08* (2006.01)

(52) U.S. Cl.
CPC .............. *H02P 6/002* (2013.01); *H02P 27/085* (2013.01)

(58) Field of Classification Search
USPC ............... 318/400.13, 400.34, 727, 801, 803; 341/6
See application file for complete search history.

(56) References Cited

U.S. PATENT DOCUMENTS

| 4,918,443 | A | * | 4/1990 | Yoshida et al. .................... 341/6 |
| 5,036,264 | A | * | 7/1991 | Ueki ......................... 318/400.13 |
| 5,099,186 | A | * | 3/1992 | Rippel et al. .................. 318/803 |
| 7,259,530 | B2 | | 8/2007 | Ochiai et al. |

(Continued)

FOREIGN PATENT DOCUMENTS

| CN | 101242154 | 8/2008 |
| CN | 102810920 | 12/2012 |

(Continued)

OTHER PUBLICATIONS

Taiwan Patent Office, "Office Action", Feb. 25, 2015.

(Continued)

*Primary Examiner* — Eduardo Colon Santana
*Assistant Examiner* — Cortez Cook
(74) *Attorney, Agent, or Firm* — WPAT, P.C.; Justin King (57) ABSTRACT

An output control apparatus of a motor includes a controller formed by having a power device to bridge a motor and a power supply. The controller incorporating the power device provides voltage control modulation during different motor speeds so as to fix the recharging voltage at the DC bus in a specific range without involvement of any voltage converter. It is unnecessary to use additional complex circuits or other DC/DC converters to reduce the voltage recharged from the motor running at a high speed. In addition, space for the apparatus is reduced, and the specification and function of the original controller can be maintained without trading off work in redesigning the motor system.

6 Claims, 9 Drawing Sheets

(56) References Cited

U.S. PATENT DOCUMENTS

| | | |
|---|---|---|
| 7,402,968 B2 | 7/2008 | Wada et al. |
| 7,825,540 B2 | 11/2010 | Ogusa et al. |
| 8,222,857 B2 | 7/2012 | Kitanaka |
| 8,245,802 B2 | 8/2012 | Inoue et al. |
| 8,258,735 B2 | 9/2012 | Kitanaka |
| 8,334,678 B2 | 12/2012 | Aoyama |
| 8,450,983 B2 | 5/2013 | Gokan et al. |
| 2003/0034755 A1* | 2/2003 | Krefta et al. ............... 318/801 |
| 2003/0062870 A1* | 4/2003 | Royak et al. ............... 318/727 |
| 2007/0021873 A1* | 1/2007 | Richards ............. G06F 17/5036 700/286 |
| 2010/0201297 A1* | 8/2010 | Nachev et al. ........... 318/400.34 |

FOREIGN PATENT DOCUMENTS

| | | |
|---|---|---|
| CN | 203313111 | 11/2013 |
| EP | 1524762 A2 | 4/2005 |
| JP | 3778342 | 5/2006 |
| JP | 2011114995 | 6/2011 |
| TW | 471219 | 1/2002 |
| TW | 506185 | 10/2002 |
| TW | I244255 | 11/2005 |
| TW | I276738 | 3/2007 |
| TW | I277288 | 3/2007 |
| TW | I282207 | 6/2007 |
| TW | I320823 | 2/2010 |
| TW | 201242235 | 10/2012 |

OTHER PUBLICATIONS

Regenerative braking control strategies of switched reluctance machine for electric bicycle Xiaoyu Liu et al. Electrical Machines and Systems, 2008. ICEMS 2008. International Conference 2008 3397-3400.

Novel back-EMF detection technique of brushless DC motor drives for wide range control without using curren Yen-Shin Lai et al. Power Electronics, on IEEE Transactions 2008/03 934-940.

Development of Idling Stop System for 125 cm3 Scooters with Fuel Injection Takeshi Yanagisawa et al. 2010 SAE International Conference 2010/09 1-6.

Development of idling stop system for scooter Masayuki Toriyama et al. Technical Notes, JSAE Review, No. 22 2001 92-94.

A Cost-Effective Method of Electric Brake With Energy Regeneration for Electric Vehicles Ming-Ji Yang et al. Industrial Electronics, on IEEE Transactions 2009/06 2203-2212.

Sensorless permanent magnet AC motor drive with near zero-speed operation for electric-assisted bicycle Raute, R. et al. Power Electronics and Applications, 2005 European Conference 2005 5024-5033.

* cited by examiner

OUTPUT CONTROL APPARATUS OF A MOTOR AND METHOD FOR CONTROLLING A CONTROLLER OF THE SAME

CROSS REFERENCE TO RELATED APPLICATION

The present application is based on, and claims priority from, Taiwan (International) Application Serial Number 102145406, filed on Dec. 10, 2013, the disclosure of which is hereby incorporated by reference herein in its entirety.

TECHNICAL FIELD

The present disclosure relates to an output control apparatus of a motor and a control method for a controller of the output control apparatus, and more particularly to the control apparatus and the corresponding control method that can modulate the DC voltage to be stable within a specific range under a circumstance of varying motor speed.

BACKGROUND

Figure 1:
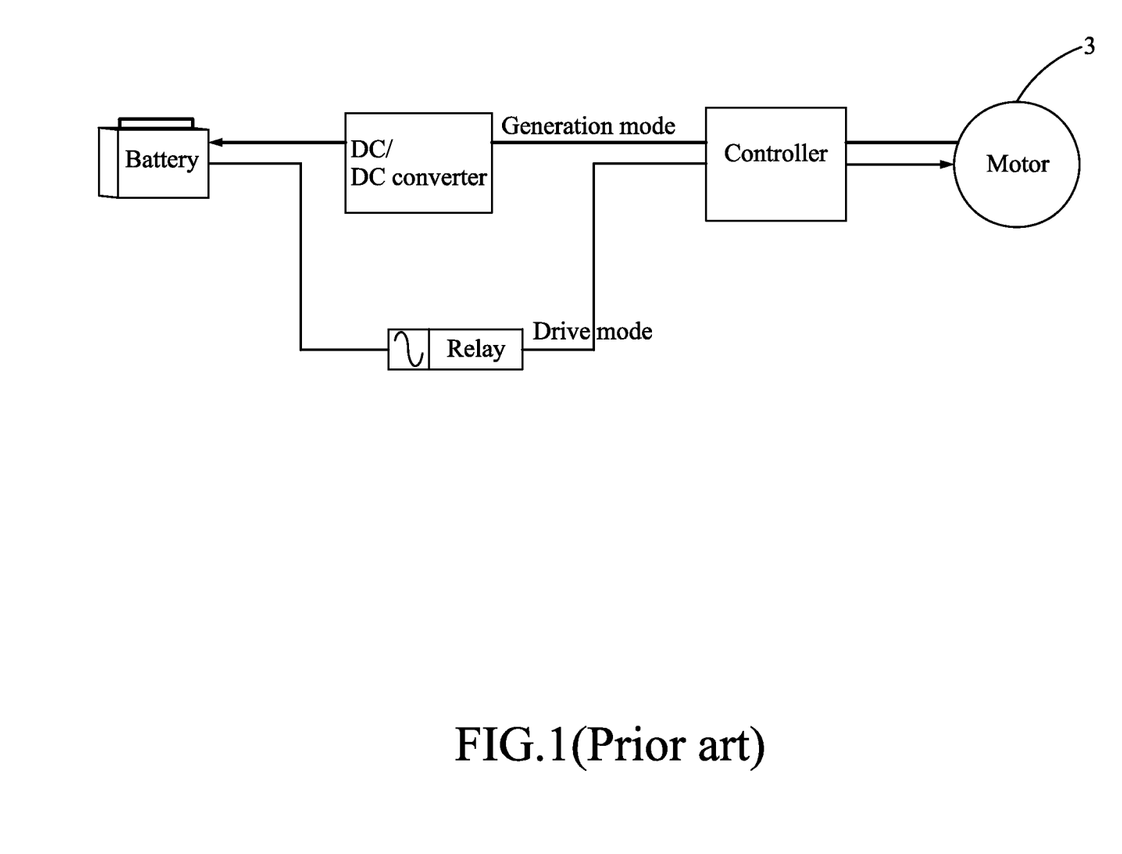
FIG. 1 is a sectional view of a conventional output control apparatus of a motor.

In a vehicle or carrier loaded with an internal combustion machine (i.e. engine) and an integrative synchronous generator, a battery can be recharged by the synchronous generator powered by the engine. For the integrative synchronous generator and the engine are co-shafted and the engine usually runs at high speeds so as to drive the vehicle, the back electromotive force (Back-EMF) induced by the integrative synchronous generator would be much larger than the battery voltage at the input end. Hence, without adequate circuit protection or voltage conversion, the recharging voltage upon the battery would damage the battery and the control system as well. In the art, a DC/DC converter is introduced to bridge the synchronous generator and the input power source so as to perform high-low voltage conversion and thereby not to risk the system power source. Referring to FIG. 1, in order to operate the apparatus normally, a start power is needed, but such a power would degrade the conversion of the system power source and also increase the occupation volume and the cost. Further, the accompanying sub-systems or parts shall be rearranged to meet the involvement of the DC/DC converter.

In another prior-art application of the voltage reduction upon the electric vehicles, a pulse-width modulating method is to introduce a reverse current to cancel the recharging current, such that the induced recharging voltage due to hi-speed operation of the motor can be reduced. Thereby, burning down of the controller due to over powering can thus be avoided. However, the aforesaid method may cost the power device to suffer the high-frequency switching. Shortcomings from the high-frequency switching may include the loss of current switching, the reduced lifetime from over-rating and the heat dissipation problem from high-frequency switching.

In a Taiwan Patent No. I244255, the engine speed is used to determine the rotor speed. While the engine speed is at a low-speed state, a driving device is introduced to control the angle-lag current flow of a rectifier so as to increase the magnetic flux as well as the generation capacity. In another Taiwan Patent No. I277288, the state of accelerating of an engine is evaluated by a signal of throttle open angle so as to regulate the output of the generator and thus further to eliminate the occurrence of some meaningless generation run. In addition, in a Taiwan Patent No. I276738, an engine is started by rocking a start motor. As soon as the engine starts, the electricity to the start motor is then terminated, such that the redundant engine rocker run is then avoided. Definitely, all the aforesaid techniques do contribute to resolve the output control problem in the motor.

In an European Patent No. EP1524762 A2, the accelerating of the engine as well as the recipe for the power output control are judged by the turning rate of the throttle. In the disclosure, as soon as the power output is regulated back to a predetermined value, the control on the power output is then reset. In U.S. Pat. No. 8,334,678 B2, the voltage output of the generator is controlled by a voltage control circuit. In U.S. Pat. No. 7,402,968 B2, the angular relationship between the signal of the power device and the rotor is computed by evaluating the torque, the battery voltage, the temperature, the rotor angle and so on. Also, through the timing control upon the switching of the power device, the switching of the power source can be thus adequately regulated.

In all the aforesaid prior art, resorts of hardware circuit designs are used to eliminate the current impulses so as to protect the power elements, and thus the system shutdown or failure caused by the abrupt noise disturbances at the negative end can be avoided. Also, due to the wave form of the output current is positively modified, the efficient power run can be ensured and also the energy loss can be reduced.

SUMMARY

The present disclosure is to provide an output control apparatus of a motor and a corresponding control method for a controller of the output control apparatus, by both of which the DC/DC converter between the motor and the input power source can be removed, and such that substantial reduction in cost and occupation volume can be obtained. An exemplary embodiment of the output control apparatus in this disclosure comprises a controller, a power supply and a motor. The control method is applied to the controller of the output control apparatus. Upon such an arrangement, both the miniaturization upon the whole system including the output control apparatus and the added value can be obtained. Through the teaching of this disclosure, the domestic controller industry can be promoted, and various application fields can be benefitted, such as the development of the electric-powered vehicles and the extensive ranged motorcycles with internal combustion engines.

In one embodiment of this disclosure, the output control apparatus of a motor comprises a controller, a motor and a power supply. A power device of the controller is to connect the motor and the power supply. The controller further includes a DC current detector, a motor speed detector, a stage-determining unit, a rotor angle predictor, a rotor angle predictor, a power device and an angle lead/lag unit, in which the DC current detector and the motor speed detector are connected with the stage-determining unit, the stage-determining unit, the motor speed detector, the rotor angle predictor and the DC voltage detector are connected with the angle lead/lag unit, and a work period-setup unit is connected with the stage-determining unit, the angle lead/lag unit and the power device.

In another embodiment of this disclosure, a control method for the controller of the output control apparatus of the motor comprises a step of applying a controller, a motor and a power supply, in which the controller is connected with the motor and the power supply via the power device, in which the controller has the power device to perform voltage control modulation under a circumstance of varying a motor speed so as to modulate a recharging voltage at a DC bus to be within a specific range. The method of applying the controller includes a step of applying a DC current detector, a motor speed detector, a stage-determining unit, a rotor angle predictor, a DC voltage detector, an angle lead/lag unit and a work period-setup unit, in which the DC current detector and the motor speed detector are connected with the stage-determining unit, in which the angle lead/lag unit is connected with the stage-determining unit, the motor speed detector, the rotor angle predictor and the DC voltage detector, in which the work period-setup unit is connected with the stage-determining unit, the angle lead/lag unit and the power device.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 6 shows a comparison of the power control signal and the Hall signal, without any phase shift in between;

FIG. 7 shows a comparison of the power control signal and the Hall signal, with a specific phase shift in between;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
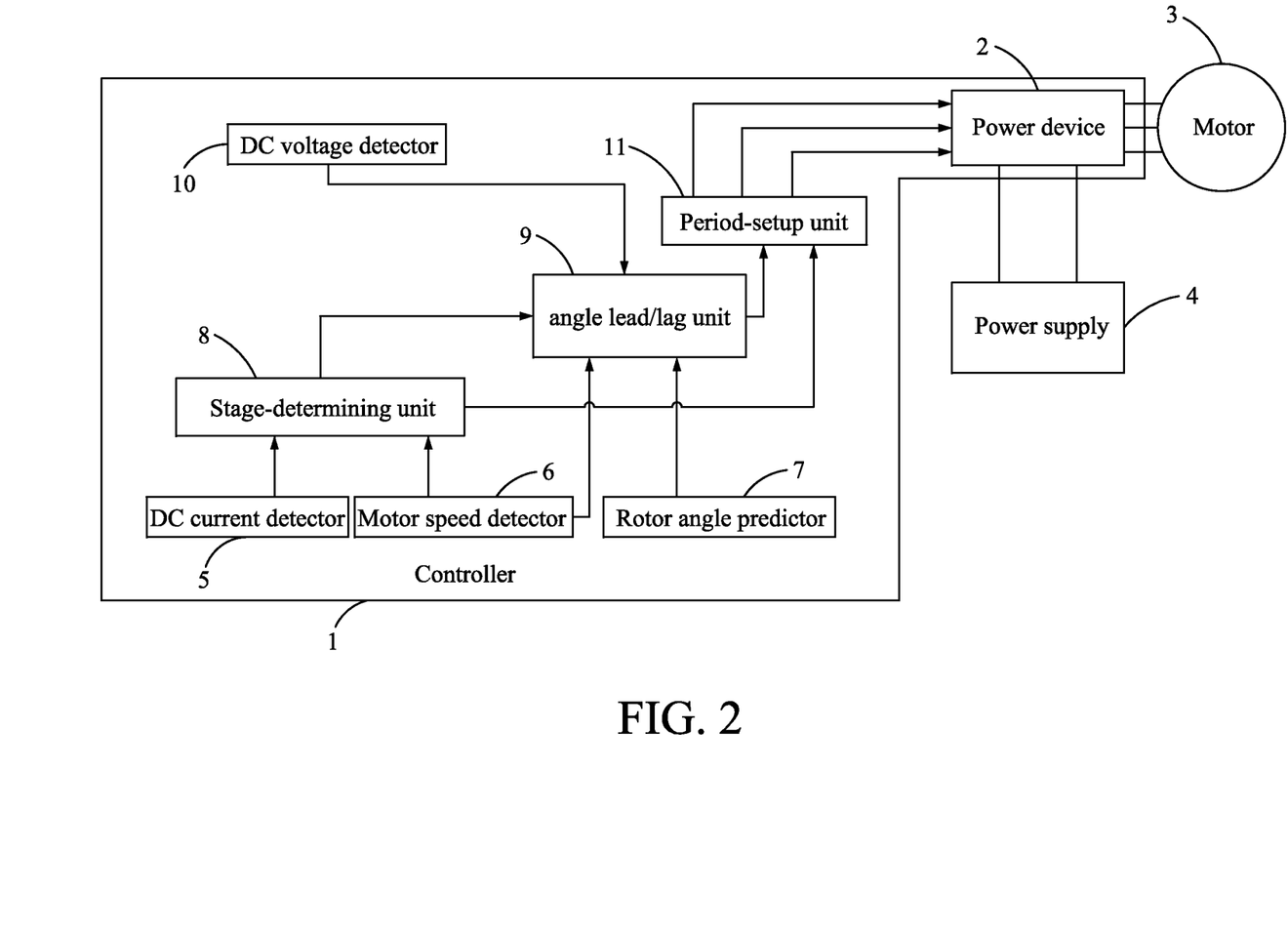
FIG. 2 is a schematic view of an exemplary embodiment of the output control apparatus of a motor in this disclosure.

Referring now to FIG. 2, an exemplary embodiment of the output control apparatus for motors includes a controller 1, a motor 3 and a power supply 4. The controller 1 further includes a DC current detector 5, a motor speed detector 6, a stage-determining unit 8, a rotor angle predictor 7, an angle lead/lag unit 9 and a power device 2. In this embodiment, the DC current detector 5 and the motor speed detector 6 are connected to the stage-determining unit 8. The stage-determining unit 8, the motor speed detector 6, and the rotor angle predictor 7, while the DC voltage detector 10 is connected with the angle lead/lag unit 9. As shown, the work period-setup unit 11 is connected with the stage-determining unit 8, the angle lead/lag unit 9 and the power device 2. Further, the power device 2 is connected to the power supply 4. The controller 1 has the power device 3 to perform voltage control modulation under a circumstance of varying a speed of the motor 3 so as to modulate a recharging voltage at the DC bus to be within a specific range.

In another exemplary embodiment of this disclosure, a control method for the controller of the output control apparatus of the motor comprises a step of applying a work period-setup unit, a step of applying a stage-determining unit, a step of applying a power device, and a step of applying an angle lead/lag unit. In this embodiment, the controller has the power device to perform voltage control modulation under a circumstance of varying a motor speed so as to modulate a recharging voltage at a DC bus to be within a specific range.

Figure 5:
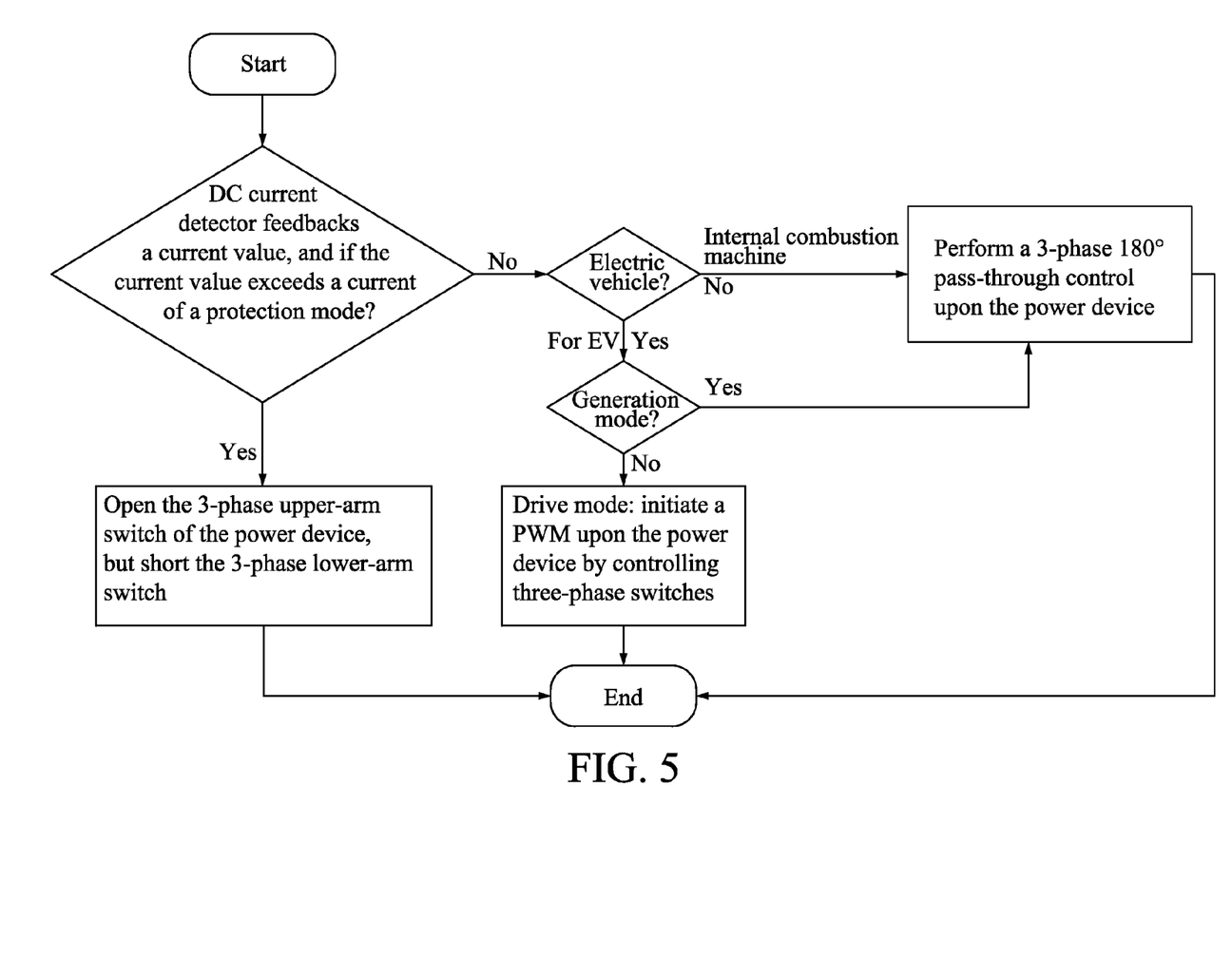
FIG. 5 is a flowchart of the work period-setup unit of FIG. 2.
Figure 8:
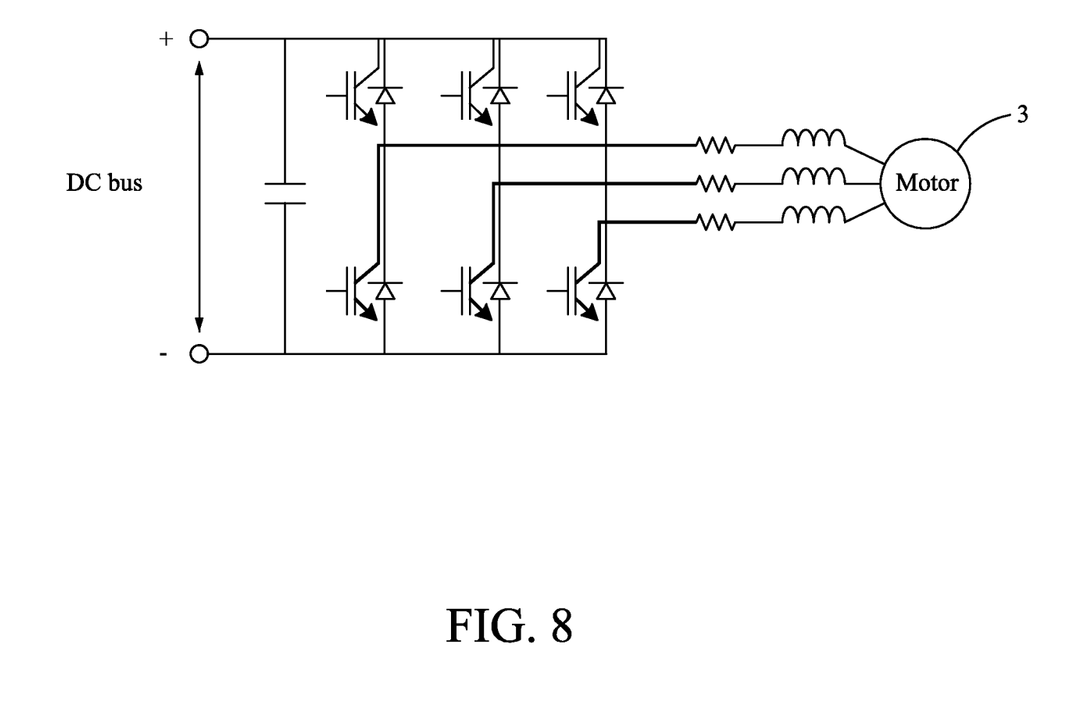
FIG. 8 shows a state of the power device of FIG. 2 in a protection mode.
Figure 9:
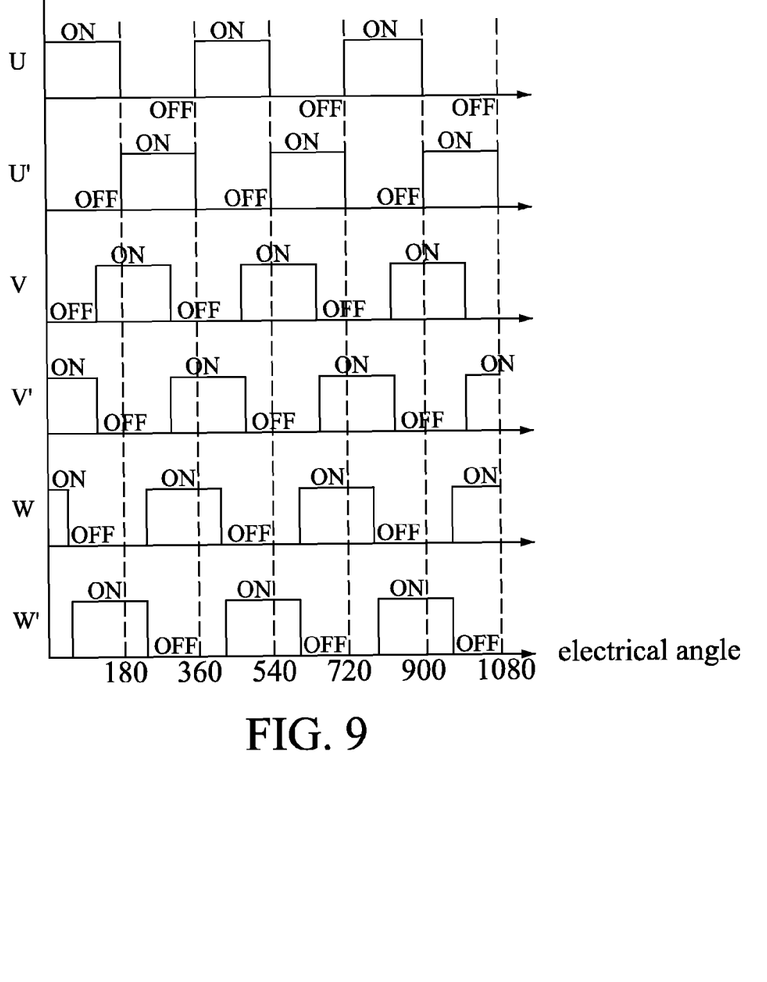
FIG. 9 is an on-off state of the power control signals for FIG. 2.

Refer to FIG. 5 for a flowchart of the method for applying the work period-setup unit. Firstly, the current detector 5 feedbacks a current value. In the case that the current value is larger than a current of a protection mode, then open a three-phase upper-arm switch, a U-phase switch, a V-phase switch and a W-phase switch of the power device 2, and short a three-phase lower-arm switch, a U'-phase switch, a V'-phase switch and a W'-phase switch of the power device 2, as shown in FIG. 8. in the case that the current value is not larger than the current of the protection mode, then check if an electric vehicle exists. If the answer is positive, then go check if it is in the generation mode. If the answer is positive again, then perform a three-phase 180° pass-through control upon the power device 2. If there is not the generation mode, then assign a drive mode thereto to initiate a pulse-width modulation (PWM) upon the power device 2 by controlling three-phase switches. In the case that the current value is smaller than the current of the protection mode and there does not exist the electric vehicle, then assign an internal combustion machine thereto to perform the three-phase 180° pass-through control upon the power device 2. As shown in FIG. 9, by having a three-phase six-pole motor 3 for example, the three-phase pass-through switching is controlled by six power devices 2. The three-phase upper-arm switches symbolized by U, V and W are separated by 120 degrees, while the three-phase lower-arm switches symbolized by U', V' and W' are also separated by 120 degrees. The pass-through control is performed under a situation of a 180-degree difference between the three-phase upper-arm switch and the corresponding three-phase lower-arm switch and by having the initial 0-degree switching angle to align with the 0-degree rotor angle of the motor. As the motor 3 runs, the control is achieved by utilizing the electrical angles of the rotor and by switching the three-phase switches.

Figure 3:
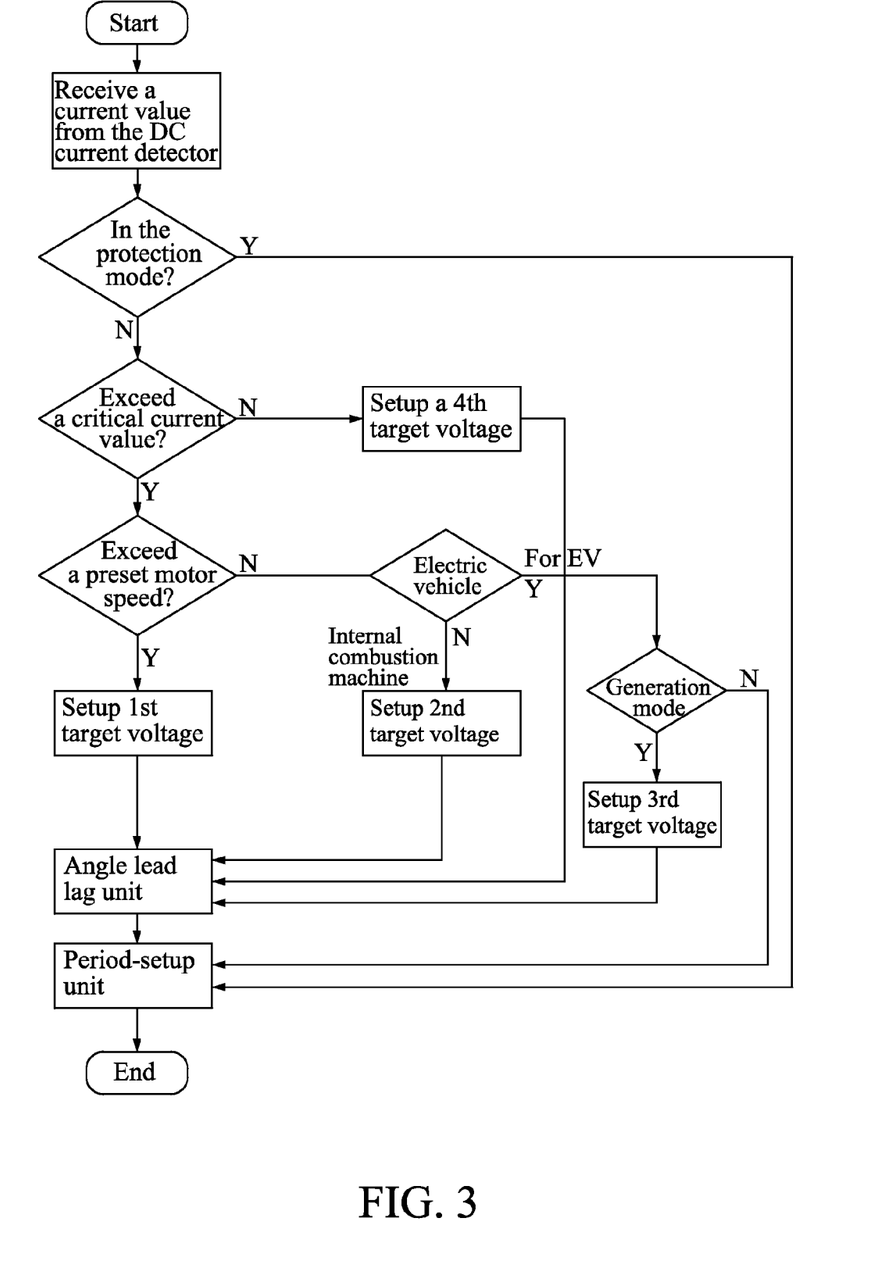
FIG. 3 is a flowchart for the stage-determining unit of FIG. 2.

As shown in FIG. 3, the method of applying the stage-determining unit 8 includes the steps of: receiving a current value feedback from the DC current detector 5; assigning the protection mode and performing safety protection in the work period-setup unit 11 if the current value is larger than a current of a protection mode; in the case that the current value is not larger than the current of the protection mode, then determining whether or not the current value is larger than a critical current value; if the current value is larger than the critical current value, then going to setup a fourth target voltage and further to perform the angle lead/lag unit 9 and then the work period-setup unit 11; if the current value is not larger than the critical current value, then feeding back the motor speed according to the motor speed detector 6; if the motor speed is not larger than a preset motor speed, then determining whether or not an electric vehicle exists; if there is the electric vehicle, then determining whether or not a generation mode exists; if there exists the generation mode, then going to setup a third target voltage and further to perform the angle lead/lag unit 9 and then the work period-setup unit 11; after the motor speed detector 6 feeds back the motor speed and there does not exist the electric vehicle, assigning an internal combustion machine and then going to setup a second target voltage and further to perform the angle lead/lag unit 9 and then the work period-setup unit 11; and, if the motor speed is not larger than a preset motor speed, then going to setup a first target voltage and further to perform the angle lead/lag unit 9 and then the work period-setup unit 11.

Figure 4:
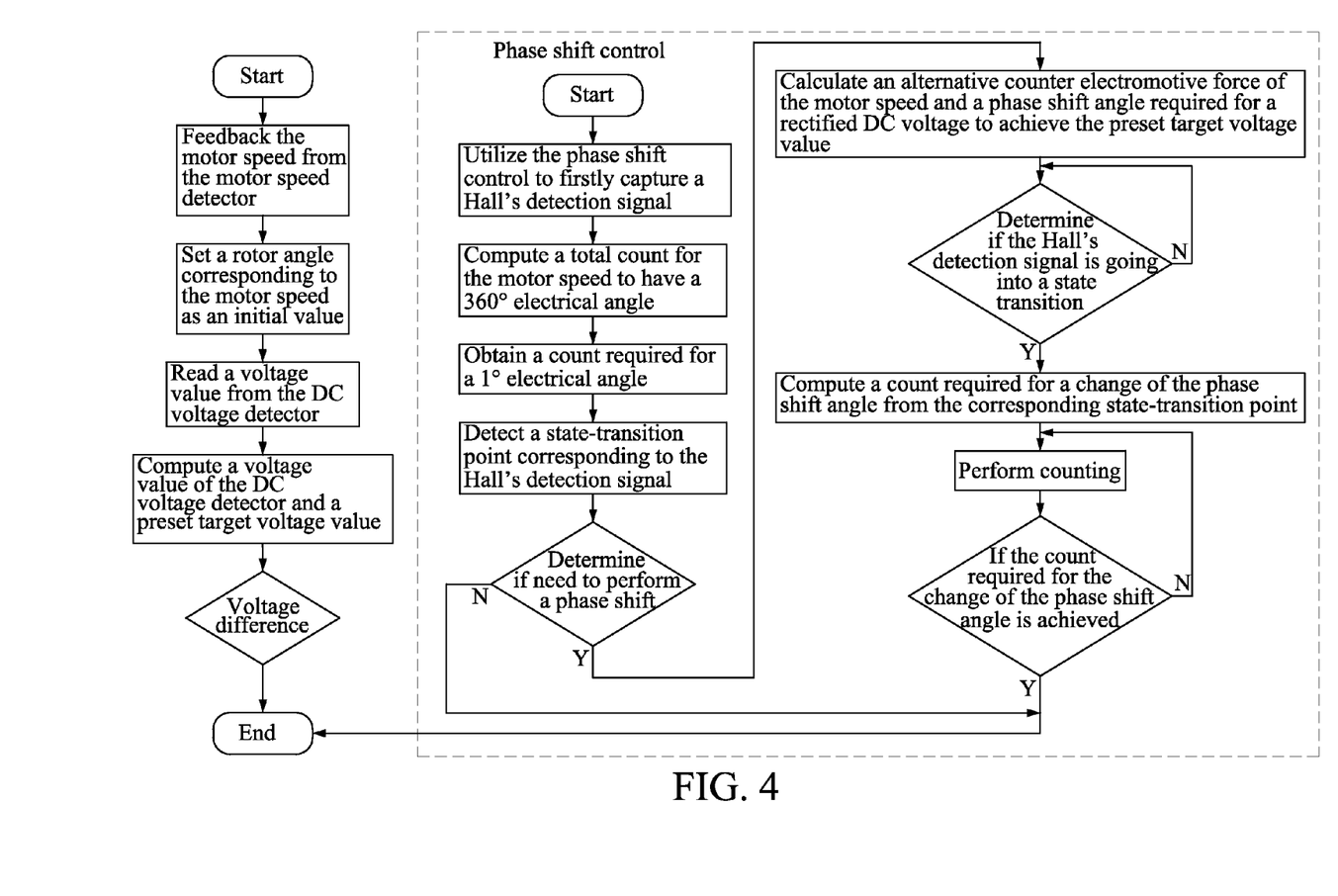
FIG. 4 is a flowchart of the angle lead/lag unit of FIG. 2.
Figure 6:
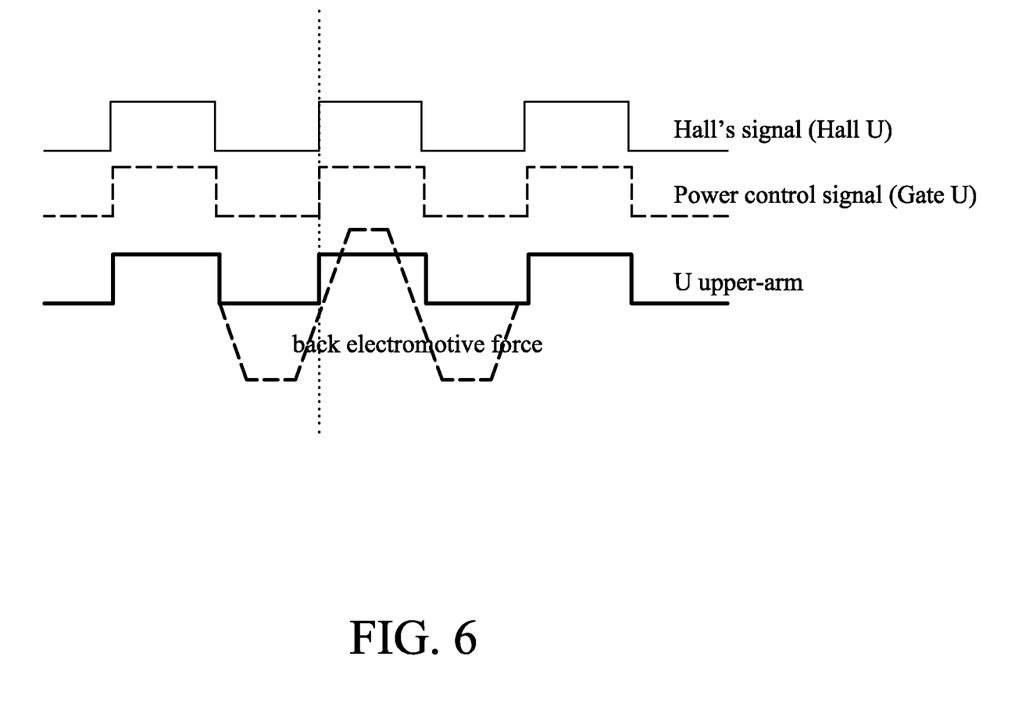
Figure 7:
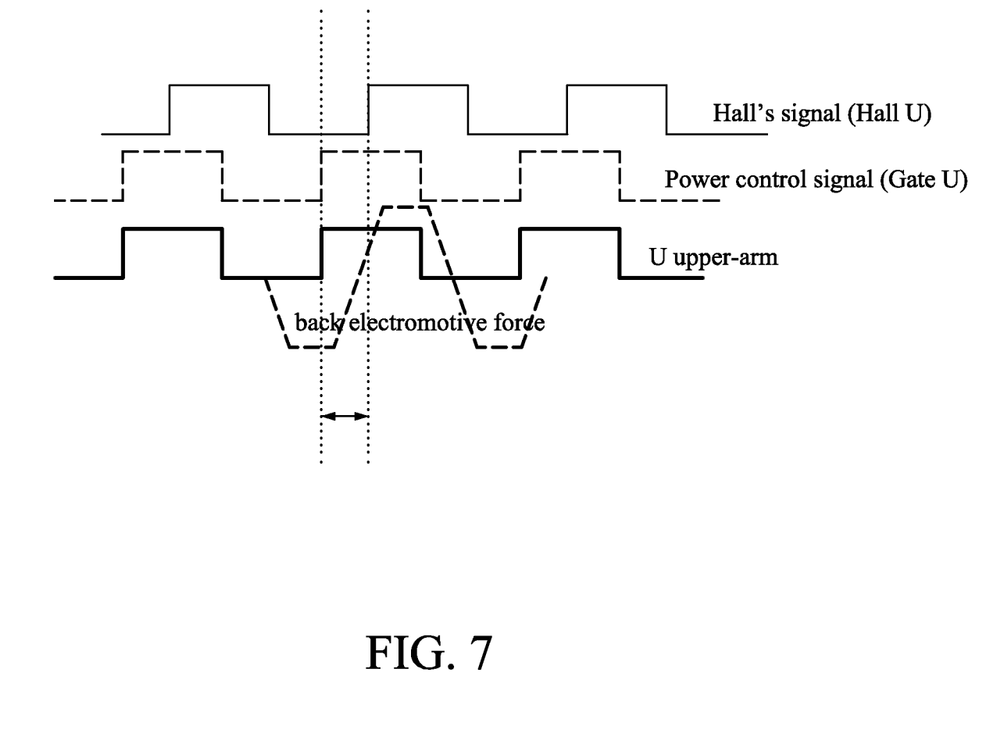

As shown in FIG. 4, the method of applying the angle lead/lag unit 9 includes the steps of: according to the motor speed detector 6 to feed back the motor speed; setting a rotor angle of the motor corresponding to the motor speed as an initial value; reading a voltage value from the DC voltage detector 10; computing a voltage difference between the voltage value of the DC voltage detector 10 and a preset target voltage value; if the voltage difference is larger than a critical voltage difference, going to perform a phase shift control; utilizing the phase shift control to firstly capture a Hall's detection signal; computing a total count for the motor speed to have a 360° electrical angle; having a count required for a 1° electrical angle; detecting a state-transition point corresponding to the Hall's detection signal; determining whether or not to perform a phase shift; if the phase shift is needed, then going to calculate an alternative back electromotive force of the motor speed and a phase shift angle required for a rectified DC voltage to achieve the preset target voltage value; determining whether or not the Hall's detection signal is going into a state transition; if the Hall's detection signal goes into the state transition, computing a count required for a change of the phase shift angle from the corresponding state-transition point; and, performing counting till the count required for the change of the phase shift angle is achieved. For example, by having a U-phase power device 2 to pair a motor having a Hall element, the power control signal (at Gate U) and the Hall's signal (at Hall U) are synchronized if no phase shift is needed by performing the corresponding calculation in the angle lead/lag unit 9, as shown in FIG. 6. If the calculation shows a need in phase shift, an angular difference would exist between the power control signal (at Gate U) and the Hall's signal (at Hall U), as shown in FIG. 7.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An output control apparatus of a motor, comprising:
   a motor, connected with a controller;
   a power supply, connected with the controller;
   the controller comprising,
      a DC current detector;
      a power device, connected with the motor, the power supply and the DC current detector; and the DC current detector is to feedback a current value;
      a motor speed detector;
      a stage-determining unit, connected with the DC current detector and the motor speed detector;
      a rotor angle predictor;
      a DC voltage detector; and
      an angle lead/lag unit, connected with the stage-determining unit, the motor speed detector, the rotor angle predictor and the DC voltage detector;\
   wherein the controller has the power device to perform voltage control modulation under a circumstance of varying a motor speed so as to modulate a recharging voltage at a DC bus to be within a specific range; in the case that the current value is larger than a current of a protection mode, opening a three phase upper-arm switch, a U-phase switch, a V-phase switch and a W-phase switch of the power device, and shorting a three-phase lower-arm switch, a U'-phase switch, a V'-phase switch and a W'-phase switch of the power device.

2. The output control apparatus of a motor according to claim 1, wherein the controller further includes:
   a work period-setup unit, connected with the stage-determining unit, the angle lead/lag unit a and the power device.

3. A method for controlling a controller, comprising the steps of:
   applying a work period-setup unit;
   applying a stage-determining unit;
   applying an angle lead/lag unit;
   having a DC current detector to feedback a current value; and
   in the case that the current value is larger than a current of a protection mode, opening a three-phase upper-arm switch, a U-phase switch, a V-phase switch and a W-phase switch of the power device, and shorting a three-phase lower-arm switch, a U'-phase switch, a V'-phase switch and a W'-phase switch of the power device;
   wherein the controller has a power device to perform voltage control modulation under a circumstance of varying a motor speed so as to modulate a recharging voltage at a DC bus to be within a specific range.

4. The method for controlling a controller according to claim 3, wherein the step of applying the work period-setup unit further includes the steps of:
   in the case that the current value is smaller than the current of the protection mode, then determining whether or not an electric vehicle exists; if the electric vehicle exists, then further determining whether or not there is a generation mode; if there is the generation mode, then performing a three-phase 180° pass-through control upon the power device;
   if there is not the generation mode, assigning a drive mode to initiate a pulse-width modulation (PWM) upon the power device by controlling three-phase switches; and
   in the case that the current value is smaller than the current of the protection mode and there does not exist the electric vehicle, assigning an internal combustion machine to perform the three-phase 180° pass-through control upon the power device.

5. The method for controlling a controller according to claim 3, wherein the step of applying the stage-determining unit further includes the steps of:
   receiving a current value feedback from the DC current detector; if the current value is larger than a current of a protection mode, then assigning the protection mode and performing safety protection in the work period-setup unit;
   in the case that the current value is not larger than the current of the protection mode, then determining whether or not the current value is larger than a critical current value; if the current value is larger than the critical current value, then going to setup a fourth target voltage and further to perform the angle lead/lag unit and then the work period-setup unit;
   if the current value is not larger than the critical current value, then feeding back the motor speed according to the motor speed detector; if the motor speed is not larger than a preset motor speed, then determining whether or not an electric vehicle exists; if there is the electric vehicle, then determining whether or not a generation mode exists; if there exists the generation mode, then going to setup a third target voltage and further to perform the angle lead/lag unit and then the work period-setup unit;

after the motor speed detector feeds back the motor speed and there does not exist the electric vehicle, assigning an internal combustion machine, and then going to setup a second target voltage and further to perform the angle lead/lag unit and then the work period-setup unit; and if the motor speed is not larger than a preset motor speed, then going to setup a first target voltage and further to perform the angle lead/lag unit and then the work period-setup unit.

6. The method for controlling a controller according to claim 3, wherein the step of applying the angle lead/lag unit further includes the steps of:

according to the motor speed detector to feed back the motor speed;

setting a rotor angle of the motor corresponding to the motor speed as an initial value;

reading a voltage value from a DC voltage detector;

computing a voltage difference between the voltage value of the DC voltage detector and a preset target voltage value;

if the voltage difference is larger than a critical voltage difference, going to perform a phase shift control;

utilizing the phase shift control to capture a Hall's detection signal;

computing a total count for the motor speed to have a 360° electrical angle;

having a count required for a 1° electrical angle;

detecting a state-transition point of the Hall's detection signal;

determining whether or not to perform a phase shift; if the phase shift is needed, then going to calculate an alternative back electromotive force of the motor speed and a phase shift angle required for a rectified DC voltage to achieve the preset target voltage value;

determining whether or not the Hall's detection signal is going into a state transition;

if the Hall's detection signal goes into the state transition, computing a count required for a change of the phase shift angle from the corresponding state-transition point; and performing counting till the count required for the change of the phase shift angle is achieved.

* * * * *